US008471087B2

(12) United States Patent
Diaz et al.

(10) Patent No.: US 8,471,087 B2
(45) Date of Patent: Jun. 25, 2013

(54) PROCESS THAT UTILIZES COMBINED DISTILLATION AND MEMBRANE SEPARATION IN THE SEPARATION OF AN ACIDIC CONTAMINANT FROM A LIGHT HYDROCARBON GAS STREAM

(75) Inventors: Zaida Diaz, Katy, TX (US); Shu Shu, Sugar Land, TX (US); Paul Jason Williams, Richmond, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/320,774

(22) PCT Filed: May 17, 2010

(86) PCT No.: PCT/US2010/035052
§ 371 (c)(1),
(2), (4) Date: Nov. 16, 2011

(87) PCT Pub. No.: WO2010/135210
PCT Pub. Date: Nov. 25, 2010

(65) Prior Publication Data
US 2012/0065450 A1     Mar. 15, 2012

Related U.S. Application Data

(60) Provisional application No. 61/179,541, filed on May 19, 2009.

(51) Int. Cl.
*C07C 7/04*     (2006.01)
*C07C 7/144*   (2006.01)

(52) U.S. Cl.
USPC ............. 585/802; 585/818; 585/807; 62/624; 62/928

(58) Field of Classification Search
None
See application file for complete search history.

(56) References Cited

U.S. PATENT DOCUMENTS

| | | | | |
|---|---|---|---|---|
| 4,417,449 | A * | 11/1983 | Hegarty et al. | 62/622 |
| 4,444,571 | A * | 4/1984  | Matson | 95/48 |
| 4,936,887 | A   | 6/1990  | Waldo et al. | 62/24 |
| 4,978,430 | A * | 12/1990 | Nakagawa et al. | 203/14 |
| 5,131,928 | A * | 7/1992  | Blackman et al. | 96/5 |
| 5,647,227 | A   | 7/1997  | Lokhandwala | 62/624 |
| 6,161,386 | A   | 12/2000 | Lokhandwala | 60/649 |
| 6,161,397 | A * | 12/2000 | McNeil et al. | 62/624 |
| 6,177,373 | B1  | 1/2001  | Sterte et al. | 502/4 |
| 7,152,430 | B1  | 12/2006 | Parro | 62/624 |
| 7,316,727 | B2  | 1/2008  | Falconer et al. | 95/51 |
| 2004/0099138 | A1* | 5/2004 | Karode et al. | 95/214 |
| 2004/0182786 | A1* | 9/2004 | Colling et al. | 210/640 |
| 2006/0042463 | A1  | 3/2006 | Frantz | 95/49 |

OTHER PUBLICATIONS

Perry's Chemical Engineers'; "Distillation"; Handbook, 6$^{th}$ Ed., pp. 13-1 through 13-7, 1997.
Perry's Chemical Engineers'; "Liquid-Gas Systems'" Handbook, 6$^{th}$ Ed., pp. 18-1 through 18-41, 1997.
Perry's Chemical Engineers'; "Psychrometry, Evaporative Cooling, Refrigeration, and Cryogenic Processes"; Handbook, 6$^{th}$ Ed., pp. 12-24 through 12-39, 1997.

* cited by examiner

*Primary Examiner* — Tam M Nguyen

(57) ABSTRACT

Disclosed is a process for separating an acidic contaminant and light hydrocarbon of a light hydrocarbon feed having a large contaminating acidic contaminant content. Among other features, the process uses a combination of distillation and membrane separation arranged in a unique way to yield a high-purity light hydrocarbon product and a high-purity acidic contaminant product.

5 Claims, 3 Drawing Sheets

PROCESS THAT UTILIZES COMBINED DISTILLATION AND MEMBRANE SEPARATION IN THE SEPARATION OF AN ACIDIC CONTAMINANT FROM A LIGHT HYDROCARBON GAS STREAM

CROSS REFERENCE TO EARLIER APPLICATIONS

The present application is a national stage application of International application No. PCT/US2010/035052, filed 17 May 2010, which claims priority from U.S. patent application 61/179,541 filed with the USPTO on 19 May 2009, which is incorporated herein by reference.

FIELD OF THE INVENTION

This invention relates to a process for the separation of an acidic contaminant from a light hydrocarbon gas stream to provide a high-purity hydrocarbon product and an acid stream product that is highly concentrated in the acidic contaminant. The process utilizes a combination of fractional distillation and membrane separation.

BACKGROUND OF THE INVENTION

There are numerous sources of hydrocarbon gas that contain such significant concentrations of carbon dioxide ($CO_2$) and other acidic contaminants such as hydrogen sulfide ($H_2S$) and carbonyl sulfide (COS) that the gas from these sources is unsuitable for uses such as the introduction into pipelines for sale and delivery to end-users. Among these sources is gas from natural gas reservoirs that may have such high concentrations of an acidic contaminant that conventional methods of removing the acidic contaminant is not economical or even technically feasible, thus, making these reservoirs non-producible.

In the prior art is described a number of processes that include the combined use of a fractionator with a membrane separator for the processing of gaseous hydrocarbon feeds that contain large contaminating concentrations of carbon dioxide to yield a hydrocarbon product and a carbon dioxide product. One example of such a process is that which is disclosed in U.S. Pat. No. 7,152,430. The process taught by this patent handles an inlet gas stream that contains light hydrocarbons and a high concentration of carbon dioxide to yield a liquid carbon dioxide product and a hydrocarbon product. A membrane unit is used in the overhead system of the distillation column to provide for the separation of the distillation overhead stream into a hydrocarbon product system and permeate stream that is recycled to the distillation column overhead. The '430 patent indicates that the carbon dioxide and hydrocarbon product streams produced by its process are not highly pure but having hydrocarbon purities of less than 85%. U.S. Pat. No. 7,152,430 is herein incorporated by reference in its entirety.

U.S. Pat. No. 4,936,887 discloses a process for the recovery of carbon dioxide from a natural gas stream containing a large percentage of carbon dioxide. This process uses multiple distillation steps in combination with a membrane separation unit to provide a high purity methane product and a carbon dioxide product. U.S. Pat. No. 4,936,887 is herein incorporated by reference in its entirety.

There remains a need in the art for improved methods of processing high-pressure, light hydrocarbon gas streams that are contaminated with excessively high concentrations of at least one acidic component to produce a high-purity hydrocarbon product with only a minimal acidic contaminant concentration and a concentrated stream of the acidic contaminant.

SUMMARY OF THE INVENTION

One aspect of the present invention is a process for separating an acidic contaminant and a light hydrocarbon from a feed stream that comprises the acidic contaminant and the light hydrocarbon to provide a high-purity hydrocarbon product and an acid stream product that is highly concentrated in the acidic contaminant. This process comprises introducing the feed stream into a distillation fractionator for separating the acidic contaminant and the light hydrocarbon of the feed stream. Yielded from the distillation fractionator are an overhead stream that is rich in the light hydrocarbon and a bottoms stream that is rich in the acidic contaminant and suitable as the acid stream product. The overhead stream is introduced into a membrane separator for separating the overhead stream into a permeate acidic contaminant stream that is rich in the acidic contaminant and a retentate hydrocarbon product stream that is rich in the light hydrocarbon and suitable as the high-purity hydrocarbon product. The permeate acidic contaminant stream is introduced as a feed into the distillation fractionator.

DETAILED DESCRIPTION OF THE INVENTION

Figure 1:
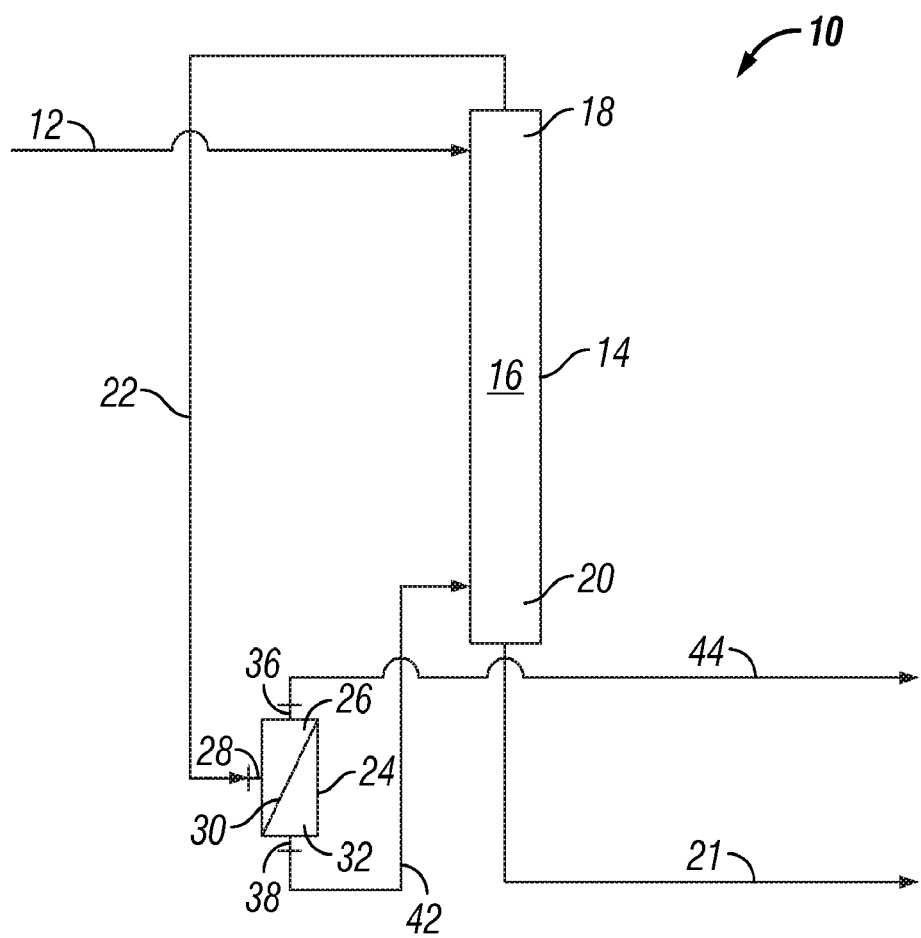
FIG. 1 is a schematic representation of the process flow of one embodiment of the inventive process.

The invention provides for the processing of a high-pressure light hydrocarbon gas stream that is contaminated with a large concentration of an acidic contaminant to yield a high-purity light hydrocarbon gaseous product stream and a liquid acidic product stream that is highly concentrated in the acidic contaminant. The inventive process is particularly useful in the processing of produced natural gas that is contaminated with unacceptably high levels of an acidic contaminant. The feed stream to the inventive process, thus, can comprise a light hydrocarbon and an acidic contaminant.

In the natural gas streams that are contemplated to be processed as the feed stream of the inventive process, the light hydrocarbons are typically low molecular weight alkane molecules, such as, methane, ethane, propane, the butanes and the pentanes, but, among these, the low molecular weight alkanes that are principally present are those selected from the group consisting of methane and ethane. However, the hydrocarbon portion of the feed stream is, more typically, predominantly methane.

The natural gas stream may further have a concentration of compounds other than the acidic contaminant and light hydrocarbon, which other compounds may include, for example, an organic sulfur compound, nitrogen, and water.

The acidic contaminant of the feed stream is, generally, an acidic compound that is normally in the gas phase at the typical temperature and pressure conditions of a produced natural gas stream. The acidic contaminant is, thus, one selected from the group of acidic compounds consisting of carbon dioxide, hydrogen sulfide, carbonyl sulfide, and any combination or mixture of two or more thereof. The acidic contaminant portion of the feed stream of the invention may include substantially a single acidic contaminant, for example, carbon dioxide, or it may include a combination or mixture of the acidic contaminants. When the feed stream includes a combination of acidic components other than carbon dioxide, it may comprise carbon dioxide and hydrogen sulfide, or carbon dioxide and carbonyl sulfide, or carbon dioxide, hydrogen sulfide and carbonyl sulfide.

The acidic contaminant, either as an individual acidic compound or as a combination of the individual acidic compounds, can be present in the feed stream at an acidic contaminant concentration in the range of from 20 volume percent (vol %) to 85 vol % of the feed stream. More particularly, the acidic contaminant concentration may be in the range of from 30 vol % to 80 vol %, and, most particularly, from 50 vol % to 75 vol %.

As noted above, the feed stream may not necessarily contain a significant or any concentration of hydrogen sulfide or carbonyl sulfide, or both such compounds, but in those embodiments of the inventive process of which the feed stream includes a concentration of hydrogen sulfide, the volumetric ratio of hydrogen sulfide-to-carbon dioxide in the feed stream may be in the range upwardly to 6:1 (vol % $H_2S$/vol % $CO_2$), or, the volumetric ratio can be in the range of from 0.01:1 to 6:1. In one example of a feed stream that comprises both hydrogen sulfide and carbon dioxide as the acidic contaminants, the hydrogen sulfide can be at a concentration in the range of from 5 vol % to 40 vol % and the carbon dioxide can be at a concentration in the range of from 5 vol % to 70 vol %.

The inventive process is particularly useful in the processing of a produced natural gas as its feed stream that is highly contaminated with carbon dioxide. Typically, this feed stream will have a carbon dioxide content that is in the range of from 20 vol % to 85 vol % of the total feed stream. More particularly, the feed stream has a carbon dioxide content that is in the range of from 30 vol % to 80 vol %, and, most particularly, from 50 vol % to 75 vol %.

Among the light hydrocarbons contained in the feed stream, methane is the predominant hydrocarbon. Generally, methane is present in the feed stream in the range of from 15 vol % to 80 vol %, and, more particularly, the feed stream has a methane content that is in the range of from 20 vol % to 70 vol %. Most particularly, the feed stream comprises from 25 vol % to 50 vol %.

The ethane content of the feed stream can be in the range up to 20 vol %, but, typically, the ethane is present at a concentration of less than 5 vol %. More typically, the ethane content of the feed stream is in the range upwardly to 4 vol %, for example, from 0.01 vol % to 4 vol %, and, most typically, in the range upwardly to 3 vol %, such as, from 0.1 vol % to 3 vol %.

The other alkane compounds that may be contained in the feed stream, such as, for example, propane, butane, pentane and heavier, if present, are at a reasonably low concentration level of less than 3 vol %. More typically, the concentration of these alkane compounds is less than 2 vol %, and most typically, less than 1 vol %.

Other examples of components that can be contained in the feed stream include, but are not limited to, nitrogen and water. These components should be present in the feed stream at a concentration of less than 10 vol %, or even less than 1 vol %. Water can be present up to the saturation concentration. The water may be removed from the feed stream or the precursor streams prior to their use as a feed to the inventive process.

The inventive process uses a unique arrangement of a continuous distillation step in combination with a membrane separation step to provide for the processing and separation of a light hydrocarbon feed stream having an exceptionally high acidic contaminant content in order to yield high-purity hydrocarbon and acidic contaminant product streams.

The feed stream of the process is fed or introduced into a distillation fractionator or column that provides for the continuous distillation of the feed stream and the separation of the acidic contaminant and light hydrocarbon thereof. The distillation fractionator or column may be of any type known to those skilled in the art that defines a distillation separation zone and which provides means for at least a partial separation of the light hydrocarbon and the acidic contaminant of the feed stream and for yielding an overhead stream that is rich in the light hydrocarbon and a bottoms stream that is rich in the acidic contaminant. It is preferred for the bottoms stream that is rich in the acidic contaminant to be an acid product stream that is highly concentrated in the acidic contaminant having a suitable composition as it is elsewhere defined herein.

The principles and operation of the continuous distillation step of the process are summarized in *Perry's Chemical Engineers' Handbook*, $6^{th}$ Ed., at pages 13-1 through 13-7. The distillation column of the invention can be any suitable equipment known to those skilled in the art such as plate columns and packed columns as are described in *Perry's Chemical Engineers' Handbook*, $6^{th}$ Ed., at pages 18-1 through 18-41.

The overhead stream has a light hydrocarbon concentration that is greater than the concentration of light hydrocarbon of the feed stream and a significant portion thereof that is the acidic contaminant. The overhead stream passes from the overhead of the distillation fractionator, which may include an overhead system, and is charged to or introduced into the feed inlet side of a membrane separator. The overhead stream may also be heated prior to its introduction into the membrane separator.

Typically, the concentration of light hydrocarbon contained in the overhead stream is less than 85 vol % and the concentration of the acidic contaminant in the overhead stream is greater than 15 vol %. More typically, the light hydrocarbon concentration in the overhead stream can be in the range of from 10 vol % to 85 vol %, or from 20 vol % to 85 vol %, with the acidic contaminant concentration being in the range of from 15 vol % to 60 vol %. Most typically, in the processing of the feed streams that are expected to be handled by the inventive process, the overhead stream will have a hydrocarbon content in the range of from 50 vol % to 80 vol % and an acidic contaminant content in the range of from 20 vol % to 50 vol %.

The membrane separator may be any suitable membrane separation apparatus known to those skilled in the art and which provides means for separating the overhead stream, which is preferably in a gaseous form, into a permeate acidic contaminant stream, comprising predominantly an acidic contaminant, and a retentate hydrocarbon product stream, comprising a major portion thereof a light hydrocarbon. The permeate acidic contaminant stream is, thus, enriched with the acidic contaminant and has a molar fraction of the acidic contaminant that exceeds that of the overhead stream. The retentate hydrocarbon product stream is enriched with light hydrocarbon and has a concentration of light hydrocarbon that exceeds that of the overhead stream.

The membrane separator provides means for separation by the utilization of a membrane barrier, or film, or supported layer that is selectively permeable to the acidic contaminant over light hydrocarbon so that the acidic contaminant and light hydrocarbon of the overhead stream are separated. The membrane material of the membrane separator may be selected from materials known to those skilled in the art, including the glassy polymers or super-glassy polymers disclosed in U.S. Pat. Nos. 7,152,430 and 5,647,227, or the rubbery polymers disclosed in U.S. Pat. No. 5,647,227. Both U.S. Pat. Nos. 7,152,430 and Pat. No. 5,647,227 are incorporated herein by reference in their entirety.

It is preferred for the membrane separator to be of the type that includes a molecular sieve membrane, including those that are supported. The molecular sieve materials that may suitably be used for the membrane layer of the supported molecular sieve membrane can include those selected from the group of molecular sieves consisting of silicates, aluminosilicates, aluminophosphates, carbon molecular sieves, and silicoaluminophosphates (SAPO). Suitable molecular sieve materials useful as a membrane layer for the selective separation of the acidic contaminant and light hydrocarbon are described in U.S. Pat. Nos. 6,177,373; 7,316,727; and U.S. Patent Provisional Application No. 61/095,814, filed 10 Sep. 2008, all of which are hereby incorporated herein by reference in their entirety. The patent application and patents also describe supported molecular sieve membrane structures and apparatuses that may be used in the separation of the acidic contaminant and a light hydrocarbon. The preferred molecular sieve material for the separation membrane is SAPO-34 and the carbon molecular sieves. Most preferred is SAPO-34.

The overhead stream is introduced into the membrane separator via a membrane separator feed inlet. The overhead stream passes over the membrane of the membrane separator. The membrane is selectively permeable to the acidic contaminant over the light hydrocarbon of the overhead stream, and it provides for the selective separation of the acidic contaminant over the light hydrocarbon to yield a permeate acidic contaminant stream that has diffused across the membrane. The retentate hydrocarbon product stream is the portion of the overhead stream that does not diffuse or pass through the membrane. The retentate hydrocarbon product stream is removed from the membrane separator by way of a retentate outlet.

The purity of the retentate hydrocarbon product stream should be such that it is a suitable hydrocarbon product, and, preferably, it is of sales or pipeline quality. Thus, the retentate hydrocarbon product stream should contain greater than 85 vol % light hydrocarbon. More preferably, the light hydrocarbon content of the retentate hydrocarbon product stream is greater than 90 vol %, and, most preferably, it is greater than 95 vol %, such as in the range of from 95 vol % to 99.9 vol %. In the preferred process, the retentate hydrocarbon product stream contains greater than 95 vol % methane, such as, in the range of from 95 vol % to 99.9 vol %

The permeate acidic contaminant stream is that which diffuses across the membrane to the permeate side of the membrane separator. The permeate acidic contaminant stream passes from the permeate side of the membrane separator and is introduced as a second feed to the distillation fractionator. It is understood that in many, if not most cases, the permeate acidic contaminant stream is compressed prior to its introduction into the distillation fractionator. This increase in pressure can be necessary due to the pressure drop that normally occurs across the membrane of the membrane separator. The acidic contaminant content of the permeate acidic contaminant stream can range upwardly to 99 vol %, e.g. from 40 vol % to 99 vol %, and, more typically, it may be in the range of from 40 vol % to 85 vol %.

The bottoms stream of the distillation fractionator is a highly concentrated acidic contaminant product containing greater than 85 vol % the acidic contaminant. Preferably, the bottoms stream comprises greater than 90 vol % the acidic contaminant, and, most preferably, the acidic contaminant content of the bottoms stream is in the range of from 95 vol % to 99.9 vol %. When the bottoms stream is a high-purity carbon dioxide product, it may be used advantageously in enhanced oil recovery applications or it may be stored in subsurface reservoirs. Thus, the bottoms stream can be introduced into a subterranean reservoir for the purpose of enhancing oil or gas production therefrom or of storing the bottoms stream.

The membrane separator can include any type of formed membrane, such as, for example, membranes formed as flat sheets, or asymmetric hollow fibers, or membranes supported on a porous structure, such as a porous sheet or a porous tube, or spiral-wound membranes, or any other type of membrane known to those skilled in the art. Typically, the membrane is housed in an appropriate type of module of the membrane separator that is equipped with a membrane separator feed inlet that provides for receiving or introducing a feed material into the membrane separator, a membrane separator retentate outlet that provides for removing a retentate stream from the membrane separator, and a membrane separator permeate side outlet that provides for removing a permeate stream from the membrane separator.

The membrane separator may include one or more or a plurality of separate membrane units that are operatively connected together in any suitable combination or arrangement to provide a desired result. In an embodiment of the invention, the membrane separator comprises a group of individual membrane units that are operatively connected in series flow communication such that the retentate from each of the membrane units is used as a feed to the inlet of a subsequent membrane unit in the series of membrane units but with the retentate from the last of the membrane units of the series passing therefrom to downstream for further processing or handling.

The permeate from the permeate side of each of the membrane units either passes downstream to be separately processed or gathered and collected together for further processing or handling. In one embodiment of the invention, permeate from each of the membrane units is introduced into a multistage compressor that defines a compression zone and provides means for compressing permeate. Because permeate from each of the membrane units is at a different pressure, the effluent from each membrane unit may be introduced at a different stage of a multistage compressor. The compressed permeate is discharged and introduced as a second feed to the distillation fractionator.

An important aspect of the inventive process can be that the distillation step is a cryogenic distillation. With the cryogenic distillation, the distillation fractionator is operated under suitable cryogenic distillation separation conditions so as to provide for the desired separation of the acidic contaminant and light hydrocarbon as described herein.

The cryogenic distillation conditions can be such that the distillation fractionator is operated under cryogenic temperature and reasonably high pressure conditions. Under these conditions, the operating pressure of the distillation fractionator is generally in the range of from 400 psia to 800 psia with the distillation fractionator overhead temperature being in the range of from −50° C. to 0° C. and the bottom temperature being in the range of from −30° C. to 40° C. The cryogenic distillation operating conditions more suitably include a distillation fractionator operating pressure in the range of from 500 psia and 700 psia, a distillation fractionator overhead temperature in the range of from −30° C. to −10° C., and a distillation fractionator bottom temperature in the range of from −15° C. to 35° C.

The overhead system of the cryogenic distillation fractionator includes an overhead condenser and a phase separator that are connected in fluid flow communication with the top end of the cryogenic distillation fractionator. In the operation of the overhead system, a vapor overhead is yielded from the top end of the cryogenic distillation fractionator and passes to the overhead condenser, which defines a heat exchange zone and provides means for condensing at least a portion of the vapor overhead.

The overhead condenser provides for the indirect heat exchange between the vapor overhead and a coolant that is preferably a refrigerant of a refrigeration system that is operatively connected to the overhead condenser to at least partially condense the vapor overhead.

Suitable refrigerants and refrigeration processes and systems are those that are taught in *Perry's Chemical Engineers' Handbook*, 6$^{th}$ Ed., at pages 12-24 through 12-39, which are hereby incorporated herein by reference in their entirety. The preferred refrigerants are those required for achieving the cryogenic distillation temperatures of the inventive process and can include propane, ethane, ethylene and certain halocarbons.

The at least partially condensed vapor overhead passes from the overhead condenser to the phase separator, which defines a separation zone and provides means for separating the at least partially condensed vapor overhead into a separated overhead vapor and a separated overhead liquid. The separated overhead vapor is used as the overhead stream that is introduced into the membrane separator. The separated overhead liquid may be used as a reflux stream to the cryogenic distillation fractionator.

FIG. 1:

Reference is now made to FIG. 1, which is a process flow schematic depicting one embodiment of the inventive process 10. Process 10 provides for the processing of a feed stream, comprising a light hydrocarbon, such as methane, and a large contaminating concentration of the acidic contaminant, such as carbon dioxide, to provide a high-purity hydrocarbon product and a high-purity an acid product stream having a high concentration of the acidic contaminant. The feed stream is charged to process 10 by way of conduit 12 and is introduced as a first feed to distillation fractionator 14.

Distillation fractionator 14 is typically a column vessel that defines a separation zone 16 in which is installed distillation trays or packing materials that provide for enhanced liquid and vapor contacting. Distillation fractionator 14 has a top end 18 and a bottom end 20 and provides means for separating the feed stream into an overhead stream that is rich in the light hydrocarbon and a bottoms stream that is rich in the acidic contaminant.

The bottoms stream from distillation fractionator 14 passes from its bottom end 20 by way of conduit 21 to downstream as a high-purity acidic contaminant product.

The overhead stream from the distillation fractionator 14 passes from its top end 18 by way of conduit 22 and is introduced into membrane separator 24 that provides means for the separation of the overhead stream by membrane separation into a permeate acidic contaminant stream that is rich in the acidic contaminant and a retentate hydrocarbon product stream that is rich in the light hydrocarbon.

Membrane separator 24 includes a feed side 26 and is equipped with a feed inlet 28 that provides for receiving a feed material, such as the overhead stream, into feed side 26. Membrane 30 of the membrane separator 24 separates feed side 26 from permeate side 32 and provides means for the selective separation of the acidic contaminant from the light hydrocarbon contained in the overhead stream.

The membrane separator 24 is additionally equipped with retentate outlet 36 and permeate outlet 38. The retentate outlet 36 provides means for removing the retentate hydrocarbon product stream from the feed side 26. The permeate outlet 38 provides means for removing the permeate acidic contaminant stream from the permeate side 32.

The permeate acidic contaminant stream passes from permeate side 32 of the membrane separator 24 through permeate outlet 38 and by way of conduit 42 to be introduced as a second feed into distillation fractionator 14. The retentate hydrocarbon product stream passes from feed side 26 of membrane separator 24 through retentate outlet 36 by way of conduit 44 to downstream as a high-purity hydrocarbon product.

Figure 2:
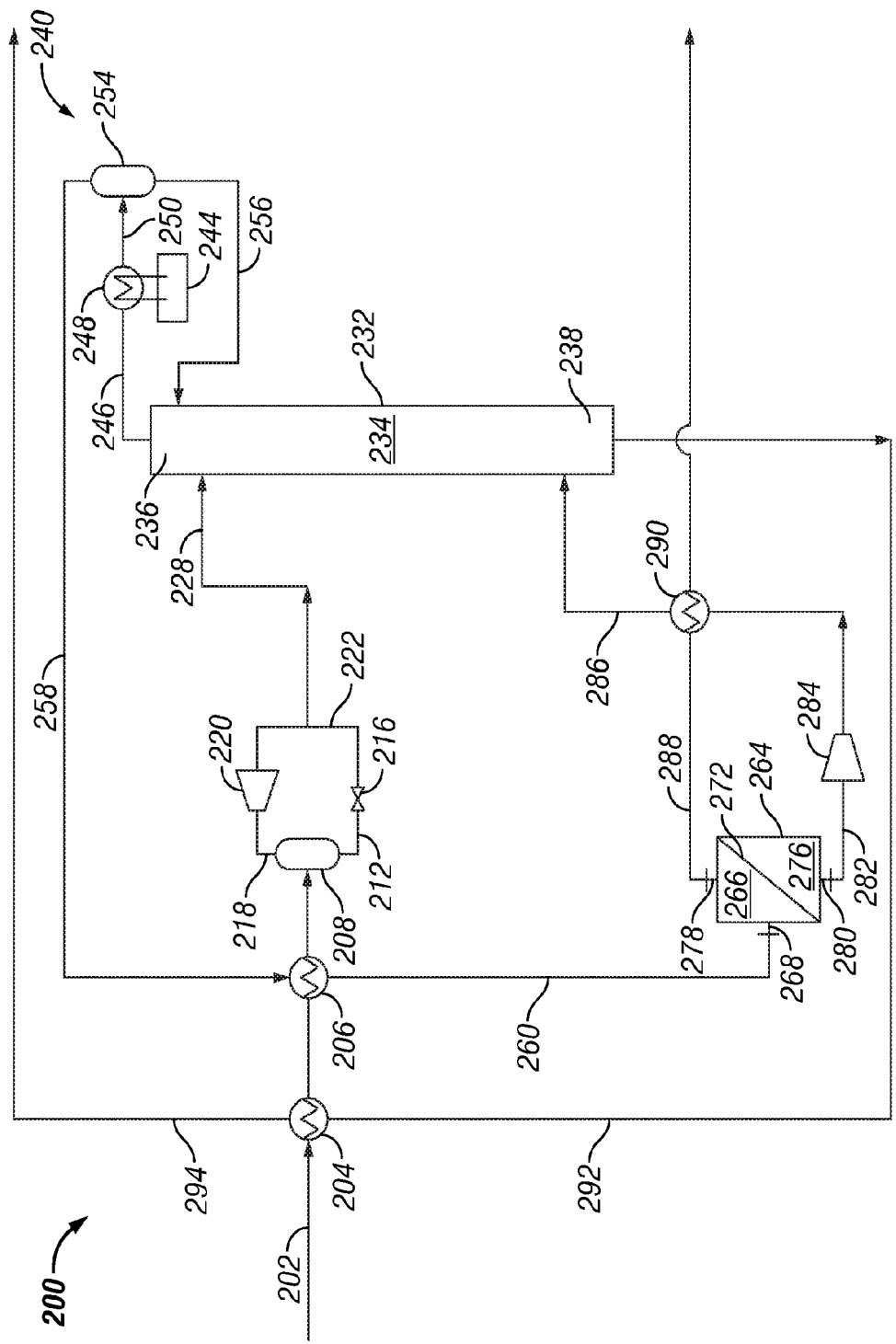
FIG. 2 is a schematic representation of a process flow that includes certain embodiments of the inventive process.

FIG. 2:

FIG. 2 is a schematic depicting a process flow that includes certain embodiments of the invention practiced by process 200. Process 200 provides for the processing of a high-pressure feed stream, such as one that may be a produced natural gas stream, comprising methane and a large contaminating concentration of acidic contaminant, to yield a high-purity light hydrocarbon product (e.g., methane) and a high-purity acidic contaminant product (e.g., carbon dioxide).

The high-pressure feed stream is fed to process 200 by way of conduit 202. The high-pressure feed stream may be treated so as to remove water, and, optionally, some hydrocarbons, prior to feeding it to process 200. Methods for the removal of water and hydrocarbons from high-pressure hydrocarbon streams are well known to those skilled in the art and may be used in the treatment of the high-pressure feed stream.

Interposed in conduit 202 is bottoms/feed exchanger 204, which defines a heat transfer zone and provides means for the exchange of heat energy between the bottoms stream of process 200 and the high-pressure feed stream. Also interposed in conduit 202 is overhead/feed exchanger 206, which defines a heat transfer zone and provides means for the exchange of heat energy between the overhead stream of process 200 and the high-pressure feed stream. Thus, the high-pressure feed stream passes through conduit 202 to bottoms/feed exchanger 204 and to overhead/feed exchanger 206 which together provide a cooled high-pressure feed stream.

The cooled high-pressure feed stream passes from overhead/feed exchanger 206 by way of conduit 202 and is introduced into phase separator 208. Phase separator 208 defines a phase separation zone and provides means for separating the cooled high-pressure feed stream into a gas fraction and a liquid fraction.

The liquid fraction passes from phase separator 208 by way of conduit 212 to expansion valve 216, which defines an expansion zone and provides means for reducing the pressure of the liquid fraction to a low-pressure liquid fraction. This expansion to a lower pressure is preferably done adiabatically. The gas fraction passes from phase separator 208 by way of conduit 218 to expansion device 220, which may be a turboexpander, that defines an expansion zone and provides means for expanding the gas fraction to a lower pressure. Expansion device 220 may also provide for the generation of work in addition to providing the low-pressure vapor fraction. The low-pressure liquid fraction and low-pressure gas fraction respectively pass by way of conduit 222 and conduit 224 to conduit 228 where they are combined to provide a feed stream.

The feed stream passes by way of conduit 228 to be introduced as a first feed into cryogenic distillation fractionator 232. Cryogenic distillation fractionator 232 includes a column that defines a separation zone 234 in which is installed distillation trays or packing materials or any other known component that can provide for or enhance liquid and vapor contacting. Cryogenic distillation fractionator 232 provides for the cryogenic separation of the feed stream into an overhead stream that is rich in methane and a bottoms stream that is rich in acidic contaminant and is a suitable high-purity acidic contaminant product.

The cryogenic fractionator 232 has a top end 236 and a bottom end 238 and is equipped with an overhead system 240. The overhead system 240 provides for heat removal by use of a refrigeration system 244 that allows for the cryogenic distillation. A vapor overhead passes from the top end 236 of cryogenic distillation fractionator 232 by way of conduit 246 to overhead condenser 248. Overhead condenser 248 defines a condensing zone and provides means for at least partially condensing the vapor overhead. The coolant used to exchange heat with the vapor overhead is supplied via refrigeration system 244 and can be selected from a group of suitable refrigerants, including, such as, ethane, ethylene, and propane.

The at least partially condensed overhead passes from overhead condenser 248 by way of conduit 250 to overhead phase separator 254. Overhead phase separator 254 defines a phase separation zone and provides means for separating the at least partially condensed overhead into a separated overhead vapor and a separated overhead liquid.

The separated overhead liquid can suitably be used as a reflux to cryogenic distillation fractionator 232. When used as a reflux, the separated overhead liquid passes from overhead phase separator 254 by way of conduit 256 and is introduced as a reflux into separation zone 234 of cryogenic distillation fractionator 232.

The separated overhead vapor passes from overhead phase separator 254 as an overhead stream that is rich in methane by way of conduit 258 to overhead/feed exchanger 206 whereby it exchanges heat with the high-pressure feed stream. The overhead stream then passes from overhead/feed exchanger 206 by way of conduit 260 to membrane separator 264 into which it is introduced.

Membrane separator 264 provides means for the separation of the overhead stream into a permeate acidic contaminant stream that is rich in the acidic contaminant and a retentate hydrocarbon product stream that is rich in the light hydrocarbon. Membrane separator 264 includes a feed side 266 and is equipped with a feed inlet 268 that provides for receiving a feed material such as the overhead stream into feed side 266. Membrane 272 of the membrane separator 264 separates feed side 266 from permeate side 276 and provides means for the selective separation of acidic contaminant from the light hydrocarbon contained in the overhead stream.

The membrane separator 264 is additionally equipped with retentate outlet 278 and permeate outlet 280. The retentate outlet 278 provides means for removing the retentate hydrocarbon product stream from the feed side 266. The permeate outlet 280 provides means for removing the permeate acidic contaminant stream from permeate side 276.

The permeate acidic contaminant stream passes from permeate side 276 of the membrane separator 264 through permeate outlet 280 and by way of conduit 282 to be introduced into the inlet of compressor 284. Compressor 284 defines a compression zone and provides means for compressing the permeate acidic contaminant stream to a higher pressure. The permeate acidic contaminant stream is discharged from compressor 284 into conduit 286 at an increased pressure and passes by way of conduit 286 and is introduced as a second feed into separation zone 234 of cryogenic distillation fractionator 232.

The retentate hydrocarbon product stream passes from feed side 266 of membrane separator 264 through retentate outlet 278, and it passes by way of conduit 288 downstream as a high-purity hydrocarbon product. Interposed in conduit 288 is retentate/permeate exchanger 290 which defines a heat transfer zone and provides means for the exchange of heat energy between the retentate hydrocarbon product stream and the permeate acidic contaminant stream.

The bottoms stream passes as a high-purity acidic contaminant product stream from bottom end 238 of cryogenic distillation fractionator 232 by way of conduit 292 to bottoms/feed exchanger 204 whereby it exchanges heat with the high pressure feed stream and then passes downstream by way of conduit 294 for further handling or processing.

Figure 3:
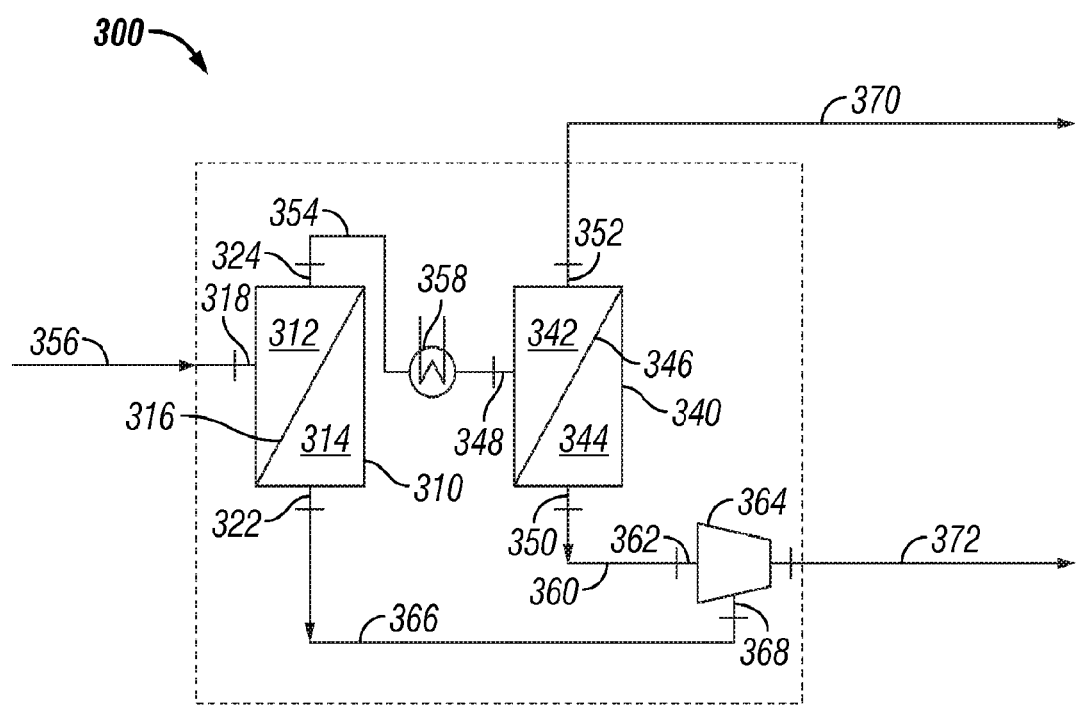
FIG. 3 is a schematic representation of the process flow of an embodiment of the membrane separator element of the inventive process.

FIG. 3:

Presented in FIG. 3 is a schematic representation of one possible type of membrane separator 300 that may be used in the inventive process. Membrane separator 300 may include one or more or a plurality of individual membrane units that are operatively connected in series or parallel flow communication to provide for a desired optimum in the separation of methane and acidic contaminant of the overhead stream of process 10 (see FIG. 1) or of process 200 (see FIG. 2).

Membrane separator 300 includes first membrane unit 310 and second membrane unit 340, which are operatively connected in series fluid flow communication. First membrane unit 310 may typically be in the form of a modular unit that defines first feed side 312 and first permeate side 314 that are separated by first membrane 316. First membrane unit 310 is further equipped with first feed inlet 318 that provides for the introduction of the overhead stream into first feed side 312 of first membrane unit 310, first permeate outlet 322 that provides for the removal of first permeate acidic contaminant stream from first permeate side 314, and first retentate outlet 324 that provides for the removal of first retentate hydrocarbon stream from first feed side 312.

Second membrane unit 340 defines a second feed side 342 and a second permeate side 344 that are separated by second membrane 346. Second membrane unit 340 is further equipped with a second feed inlet 348 that provides for the introduction of a first retentate as a feed into the second feed side 342 of second membrane unit 340, second permeate outlet 350 that provides for the removal of second permeate acidic contaminant stream from second permeate side 344, and second permeate outlet 352 that provides for the removal of the second permeate acidic contaminant stream from the second feed side 342.

Fluid flow communication is provided between first feed side 312 and second feed side 342 by conduit 354, which is operatively connected to first retentate outlet 324 and second feed inlet 348. The overhead stream is passed by way of conduit 356 to membrane separator 300 and introduced into first feed side 312 of first membrane unit 310 through first feed inlet 318. First membrane unit 310 provides for the separation of the overhead stream into a first retentate and a first permeate acidic contaminant stream. The first retentate passes from first feed side 312 of first membrane unit 310 through conduit 354 to second feed side 342 of second membrane unit 340. Interposed in conduit 354 is interstage heater 358 that provides for heating of the first retentate.

The second permeate acidic contaminant stream yielded from second permeate side 344 passes through conduit 360 to low-pressure inlet 362 of compressor 364. The first permeate acidic contaminant stream yielded from first permeate side 314 passes through conduit 366 to intermediate-pressure inlet 368 of compressor 364. Compressor 364 defines a compression zone and provides means for compressing the first permeate acidic contaminant stream and second permeate acidic contaminant stream to discharge the permeate acidic contaminant stream at an increased pressure above the pressure of the first permeate acidic contaminant stream and of the second permeate acidic contaminant stream.

The retentate hydrocarbon product stream is yielded from the second feed side 342 and passes downstream by way of conduit 370 where it may undergoes further handling or processing. The compressed permeate acidic contaminant stream passes by way of conduit 372 to be introduced as a second feed to the distillation fractionator (not shown) of the inventive process.

The invention claimed is:

1. A process for separating an acidic contaminant and a light hydrocarbon of a feed stream that comprises said acidic contaminant and said light hydrocarbon to provide a high-purity hydrocarbon product and an acid stream product that is highly concentrated in said acidic contaminant, wherein said process comprises:

introducing said feed stream into a distillation fractionator for separating said acidic contaminant and said light hydrocarbon of said feed stream;

yielding from said distillation fractionator an overhead stream that is rich in said light hydrocarbon and a bottoms stream that is rich in said acidic contaminant and suitable as said acid stream product;

introducing said overhead stream into a membrane separator for separating said overhead stream into a permeate acidic contaminant stream that is rich in said acidic contaminant and a retentate hydrocarbon product stream that is rich in said light hydrocarbon and suitable as said high-purity hydrocarbon product;

introducing said permeate acidic contaminant stream into said distillation fractionators;

yielding a vapor overhead from said distillation fractionator;

passing said vapor overhead to an overhead condenser that provides for at least partially condensing said vapor overhead to thereby provide an at least partially condensed overhead;

separating said at least partially condensed overhead into a separated overhead vapor used as said overhead stream and a separated overhead liquid useful as a reflux to said distillation fractionators;

introducing said second permeate acidic contaminant stream to a low pressure inlet of a compressor;

introducing said first permeate acidic contaminant stream to an intermediate pressure inlet of said compressor; and discharging said permeate acidic contaminant stream from said compressor at an increased pressure above the pressure of said first permeate acidic contaminant stream and said second permeate acidic contaminant stream, wherein said permeate acidic contaminant stream has an acidic contaminant concentration in the range of from 40 vol % to 99 vol %;

wherein said membrane separator comprises a plurality of membrane units arranged in series flow communication, wherein said plurality of membrane units comprises a first membrane unit and a second membrane unit, which said first membrane unit has a first feed side with a first feed inlet, a first retentate outlet and a first permeate side, and said second membrane unit has a second feed side with a second feed inlet, a second retentate outlet and a second permeate side, wherein said first retentate outlet is operatively connected in fluid flow communication with said second feed inlet, and said retentate hydrocarbon product stream is yielded from said second retentate outlet and a first permeate acidic contaminant stream is yielded from said first permeate side of said first membrane unit and a second permeate acidic contaminant stream is yielded from said second permeate side of said second membrane unit;

further comprising:

introducing a cooled high-pressure feed stream, comprising said acidic contaminant and said light hydrocarbon, to a separator for separating said cooled high-pressure feed stream into a gas fraction and a liquid fraction;

expanding said liquid fraction to a lower pressure so as to provide a low pressure liquid fraction;

expanding said gas fraction to provide a low pressure vapor fraction; and combining said low pressure liquid fraction and said low pressure vapor fraction to give said feed stream.

2. The process as recited in claim 1, further comprising:

prior to introducing said overhead stream into said membrane separator, heating said overhead stream by indirect heat exchange with said cooled high-pressure feed stream.

3. The process as recited in claim 2, wherein said light hydrocarbon is selected from the group of low molecular weight alkanes consisting of methane and ethane, wherein said feed stream contains from 20 vol % to 85 vol % of said acidic contaminant and from 15 vol % to 80 vol % of said light hydrocarbon, wherein said high-purity hydrocarbon product contains greater than 85 vol % of said light hydrocarbon, wherein said bottoms stream contains greater than 85 vol % of said acidic contaminant, and wherein said distillation fractionator is operated at a pressure in the range of from 200 psia to 900 psia.

4. The process as recited in claim 3, wherein said light hydrocarbon is methane, wherein said high-purity hydrocarbon product contains methane in the range of from 95 vol % to 99.9 vol %, and wherein said bottoms stream contains said acidic contaminant at a concentration in the range of from 90 vol % to 99.9 vol %.

5. The process as recited in claim 1, wherein said bottoms stream contains greater than 85 vol % of acidic contaminant, and wherein said process further comprises: introducing said bottoms stream into a subterranean reservoir for the purpose of enhancing oil recovery or gas production therefrom or to store said bottoms stream.

* * * * *